(No Model.)
C. O. PALMER.
CUTTER BIT HOLDER FOR MINING MACHINES.
No. 594,899. Patented Dec. 7, 1897.
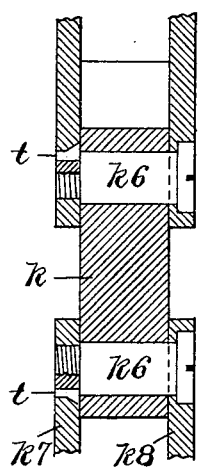
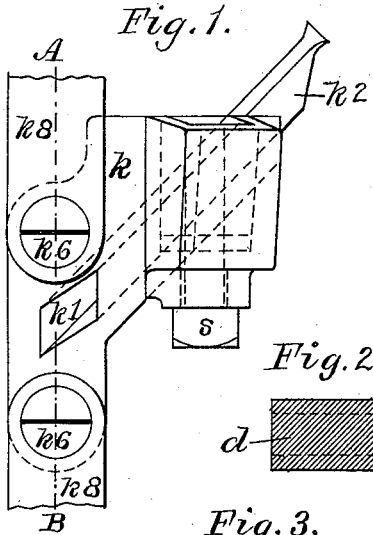
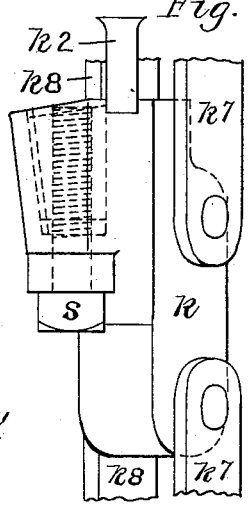
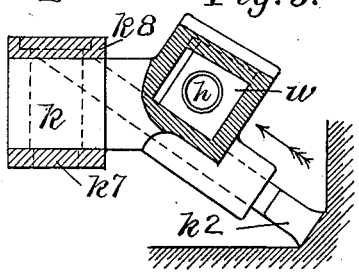
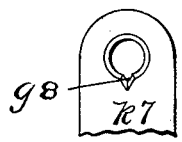
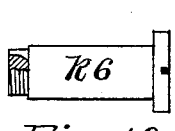
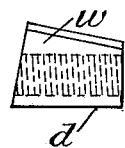
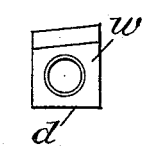
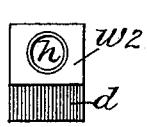
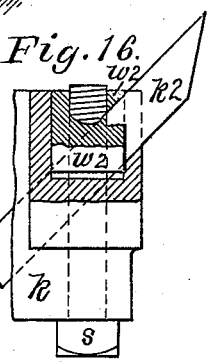
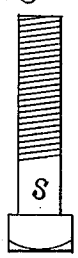
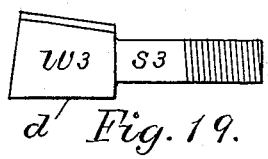
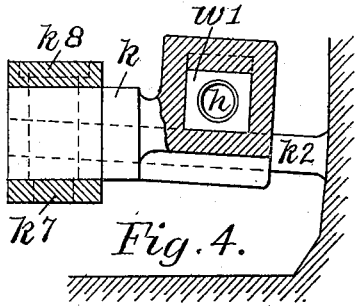
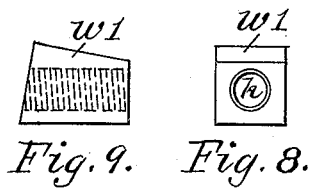
Witnesses
M. O. Palmer
K. J. Quayle
Inventor
C. O. Palmer.
THE NORRIS PETERS CO., PHOTO-LITHO., WASHINGTON, D. C.

UNITED STATES PATENT OFFICE.

CHARLES OTIS PALMER, OF CLEVELAND, OHIO.

CUTTER-BIT HOLDER FOR MINING-MACHINES.

SPECIFICATION forming part of Letters Patent No. 594,899, dated December 7, 1897.

Application filed May 27, 1896. Serial No. 593,359. (No model.)

*To all whom it may concern:*

Be it known that I, CHARLES OTIS PALMER, a citizen of the United States, residing at Cleveland, in the county of Cuyahoga and State of Ohio, have invented certain new and useful Improvements in Cutter-Bit Holders for Mining-Machines; and I do hereby declare the following to be a full, clear, and exact description of the invention, such as will enable others skilled in the art to which it appertains to make and use the same.

My invention relates to horizontally-revolving cutters for mining-machines, especially of the type in which cutter-bits are secured in sprocket-chains, and has for its object to provide improved means for holding the cutter-bits and assembling the links of said chains.

In the accompanying drawings, Figure 1 is a top view of my improved cutter-block with side chain-links attached and having a lower side cutter-bit secured in place by my improved fastening. Fig. 2 is an outside view of Fig. 1, as seen in the direction of the arrow in Fig. 3. Fig. 3 is an end view of Fig. 1 with part broken away, showing the beveled wedge. Fig. 4 is an end view of a middle cutter-block with part broken away. Fig. 5 is a detailed end view of the beveled wedge shown in Fig. 3. Fig. 6 is a side view of Fig. 5. Fig. 7 is a detailed side view of the threaded cutter-screw that engages the cutter-wedge. Fig. 8 is a detailed end view of the wedge shown in Fig. 4. Fig. 9 is a side view of Fig. 8. Fig. 10 is a vertical section in line A B of Fig. 1. Fig. 11 is a detailed inside view of a link having a countersunk groove for the pin. Fig. 12 is a detailed side view of a link-pintle with part broken away and showing a modified form of the pin-groove with its enlarged inner end being cut in the pintle instead of the link $k^7$. Fig. 13 is an end view of Fig. 12. Fig. 14 is a detailed side view of the pin that keeps the pintle from turning in the outside link as it appears after having been driven in place. Fig. 15 is a detailed side view of the pin of Fig. 14 before it is driven in place. Fig. 16 is a top view of part of a cutter-block fitted with a modified form of wedge designed to bear against the front side of the cutter-bit. Fig. 17 is a top view of the wedge shown in Fig. 16. Fig. 18 is an end view of wedge $w^2$, shown in Figs. 16 and 17. Fig. 19 is a detailed side view of a modified form of construction, in which the wedge has a threaded shank formed thereon for engaging with a tapped nut. Fig. 20 is a view of the side $d$ of wedge.

A link that carries a cutter-bit is called a "cutter-block." The cutter-block $k$ (shown in Fig. 1) is the middle link of a mining-machine cutter-chain and has side links $k^7$ and $k^8$ attached thereto by pintles $k^6$, that pass through and are journaled in the cutter-block $k$. Passing diagonally through the block is a bit-mortise $k'$, in which is placed the cutter-bit $k^2$, which projects beyond the cutter-block $k$ and has formed on its outer end a chisel-shaped edge. Formed on the side of and opening into the said bit-mortise is the wedge-mortise, and lying in this mortise at the side of the cutter-bit is the cutter-wedge $w$, into whose tapped hole screws the threaded bolt $s$. The side of the wedge next the bit is preferably file-cut or roughened. The bit $k^2$, which is also preferably file-cut or roughened on the side next the wedge, is placed in the proper position in its mortise and the wedge is inserted in its mortise from the front end and drawn tightly into place by the screw $s$, that engages with it and is turned by a wrench on the rear end.

By this construction several very important advantages are obtained. The end pressure of the coal against the cutting edge when in operation tends to drive the bit longitudinally into its mortise, but owing to the adhesion of the wedge to the bit (which is increased by one or both of their adjacent surfaces being roughened) the wedge is carried along with it and driven the more tightly in place. The greater the thrust against the cutter-bit the tighter is the wedge driven home and the more secure is the cutter-bit held in place to effectually resist the end thrust of the coal against it. Thus a very moderate tightening of the wedge-screw makes a very secure fastening of the cutter-bit. In this way the cutter-bit may be made of a straight bar of steel that may be sharpened with little or no forging by simply grinding the end, and after being inserted in its mortise in the desired position is very quickly and easily clamped by a turn of the screw. Should the screw or wedge become worn out or get injured by accident or lost, it may be instantly replaced by a spare piece without loss of time to the machine or, incidentally, what is much worse, interrupting the regular working of the mine.

When the wedge is set much angling with the bit, I prefer to bevel the wedge transversely on one of its diverging sides, as in Figs. 1, 2, 3, 5, 6, and 19, and take the self-tightening end thrust of the bit by the bevel of the wedge, for otherwise when the angle between the bit and wedge is great there is no self-tightening action at all of the cutter-bit and wedge.

When the angle between the wedge and bit is not too great, I prefer not to bevel the wedge. It is then made as shown in Figs. 8 and 9.

It is not material which side of the bit the wedge presses, so that the inward pressure of the bit tightens the wedge against its side.

Fig. 16 is a top view of part of a cutter-block in which the bit is held by a wedge $w^2$, that is made to press the front side of the bit. Fig. 18 shows an end view of wedge $w^2$, which is tapped above the plane of the bit. In Figs. 3 and 4 I have illustrated the lower middle and lower outside bits, but the upper middle and upper outside bits are secured in a similar manner and do not require any further description. A modified form of the wedge and screw is shown in Fig. 19, in which the wedge $w^3$ has a threaded shank $s^3$ formed upon its rear end, on which is screwed a nut to draw it firmly against the bit, the operation of the wedge in all these modifications being self-tightening, as before explained.

The link-pintles $k^6$, used in connecting the links together, are formed with a slotted countersunk head on one end and a thread and preferably a slight shoulder on the other end. One side link of $k^8$ has a countersunk hole in the end to fit the head of pintle $k^6$ and the other side link $k^7$ is tapped to admit the threaded end of the pintle $k^6$. A groove $g^8$ is formed on the inside edge of the pintle-hole where the pin $t$ is to be located, as shown in Fig. 11. The links are assembled by screwing them together in the position shown in Fig. 10, the pintle $k^6$ being journaled in the cutter-block $k$. To prevent pintle $k^6$ from unscrewing, a small hole is drilled beside the pintle at groove $g^8$, so that part of the hole is in the pintle $k^6$ and part in the link $k^7$. The pin $t$ is then driven into this hole with sufficient force to upset its inner end in the groove $g^8$, as shown in Figs. 10 and 14, and so prevent its dropping out.

To separate the links, the pin $t$ is drilled out and the pintle $k^6$ is unscrewed. The pin may be driven at either end of the pintle $k^6$, and the groove $g^8$ may be formed in the pintle $k^6$, if desired, as shown in Figs. 12 and 15. To provide against the accidental dropping out of a pin, two or more pins may be used with a single pintle $k^6$.

By my improved method of connecting the links they are easily and quickly separated with only a hand-drill found in an ordinary blacksmith-shop and a screw-driver. A worn or broken link may thus be replaced by a spare piece with little delay.

It is obvious that the same form of fastening may be applied to cutter-wheels, and are so shown in my application for mining-machines, Serial No. 508,022, filed April 18, 1894, and my application for a cutter-bit fastening for mining-machines, Serial No. 405,577, filed September 14, 1891.

Having thus described my invention, I claim—

1. The combination in a mining-machine cutter-chain of a cutter-block with a countersunk cutter-link on one side thereof and a tapped link on the other, a pintle having a head on one end and a thread on the other passing through said countersunk link and cutter-block and screwed into said tapped link, together with one or more pins upset on the inner end thereof as it is driven into place from the outside, and engaging said outside link and pintle to prevent the pintle turning substantially as described.

2. The combination in a mining-machine, of a horizontally-revolving cutter, one or more bit-mortises therein, a cutter-bit in said mortise, an inwardly-tapering screw-threaded wedge entering the mortise from the cutting end and engaging said bit, screw-threaded parts engaging the tapered end of the wedge and drawing the wedge together with the cutter firmly in place substantially as described.

3. The combination in a mining-machine, of a horizontally-revolving cutter, one or more bit-mortises therein, a cutter-bit in said mortise, an inwardly-tapering screw-threaded wedge entering the mortise from the cutting end and engaging said bit, the bit or wedge being file-cut or roughened, screw-threaded parts engaging the tapered end of the wedge and drawing the wedge together with the cutter firmly in place substantially as described.

4. The combination in a cutter-chain of a cutter-block, a bit-mortise extending diagonally therethrough, a horizontal rearwardly-tapering wedge-mortise extending inward from the front end of said block and opening into said bit-mortise, a cutter-bit seated in the bit-mortise, a rearwardly-tapering screw-threaded wedge entering from the forward side of the cutter-block and engaging the cutter-bit, screw-threaded parts engaging the rearward end of the wedge and drawing the wedge rearward into close engagement with the cutter-bit substantially as shown.

5. The combination in a cutter-chain of a cutter-block, a bit-mortise extending diagonally therethrough, a horizontal rearwardly-tapering wedge-mortise extending inward from the front end of said block and opening into said bit-mortise, a cutter-bit seated in the bit-mortise, a rearwardly-tapering tapped wedge entering from the forward side of the cutter-block and engaging the cutter-bit, a threaded bolt entering the rearward end of the wedge and drawing the wedge rearward into close engagement with the cutter-bit substantially as shown.

6. The combination in a cutter-chain of a cutter-block, a bit-mortise extending diagonally therethrough, a horizontal rearwardly-tapering wedge-mortise extending inward from the front end of said block and opening into said bit-mortise, a cutter-bit seated in said bit-mortise, a rearwardly-tapering screw-threaded wedge entering from the forward side of the cutter-block and engaging the cutter-bit, said bit or wedge being file-cut or roughened, screw-threaded parts engaging the rearward end of the wedge and drawing the wedge rearward into close engagement with the cutter-bit substantially as shown.

7. The combination in a cutter-chain of a cutter-block, a bit-mortise extending diagonally therethrough, a horizontal rearwardly-tapering wedge-mortise extending inward from the front end of said block and opening into said bit-mortise, a cutter-bit seated in said bit-mortise, a rearwardly-tapering tapped wedge entering from the forward side of the cutter-block and engaging the cutter-bit, said bit or wedge being file-cut or roughened, a threaded bolt entering the rearward end of the wedge and drawing the wedge rearward into close engagement with the cutter-bit substantially as shown.

8. The combination in a cutter-chain of a cutter-block, a bit-mortise extending outwardly therethrough, a horizontal rearwardly-tapering wedge-mortise having transversely-beveled sides converging inwardly and opening toward the front end of said block and communicating with said bit-mortise, a cutter-bit seated in the bit-mortise, a rearwardly-tapering screw-threaded wedge having transversely-beveled sides converging inwardly and entering from the forward side of the cutter-block and engaging the cutter-bit, screw-threaded parts engaging the rearward end of the wedge and drawing the wedge rearward into close engagement with the cutter-bit substantially as shown.

9. The combination in a cutter-chain of a cutter-block, a bit-mortise extending outwardly therethrough, a horizontal rearwardly-tapering wedge having transversely-beveled sides converging inwardly and opening toward the front end of said block and communicating with said bit-mortise, a cutter-bit seated in the bit-mortise, a rearwardly-tapering tapped wedge having transversely-beveled sides converging inwardly and entering from the forward side of the cutter-block and engaging the cutter-bit, a threaded bolt entering the rearward end of the wedge and drawing the wedge rearward into close engagement with the cutter-bit substantially as shown.

In testimony whereof I affix my signature in presence of two witnesses.

CHARLES OTIS PALMER.

Witnesses:
C. M. VORCE,
J. H. VAN DERVEER.